United States Patent
Regan et al.

(10) Patent No.: US 7,716,366 B2
(45) Date of Patent: May 11, 2010

(54) ENHANCEMENT OF VRRP INTERFACE AND ROUTER SELECTION WHERE AN NON-OWNER ROUTER IS CONFIGURED TO RESPOND TO CONTROL AND MANAGEMENT MESSAGES ADDRESSED TO AN ADDRESS ASSOCIATED WITH THE VIRTUAL REDUNDANT ROUTER

(75) Inventors: Joe Regan, Pleasanton, CA (US); Wenao Hu, San Jose, CA (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 1070 days.

(21) Appl. No.: 10/833,748

(22) Filed: Apr. 27, 2004

(65) Prior Publication Data
US 2004/0215821 A1    Oct. 28, 2004

Related U.S. Application Data

(60) Provisional application No. 60/466,323, filed on Apr. 28, 2003.

(51) Int. Cl.
G06F 15/173 (2006.01)
G01R 31/08 (2006.01)
(52) U.S. Cl. .................. 709/240; 370/216
(58) Field of Classification Search .......... 370/217–220, 370/241–244, 250–254, 351, 352, 397, 401, 370/409, 216, 25, 338; 714/1–4; 709/220–222, 709/226, 238, 240, 242
See application file for complete search history.

(56) References Cited

U.S. PATENT DOCUMENTS 5,473,599 A    12/1995    Li et al.
6,397,260 B1    5/2002    Wils et al.
6,856,591 B1 *    2/2005    Ma et al. ............... 370/216
6,954,436 B1 *    10/2005    Yip et al. ............... 370/254
7,152,179 B1 *    12/2006    Critchfield ............... 714/4
2002/0184387 A1    12/2002    Yamaya et al.
2003/0037165 A1    2/2003    Shinomiya

FOREIGN PATENT DOCUMENTS

EP    1 006 702 A2    7/2000

OTHER PUBLICATIONS

Burton, "Step-by-Step With Cisco's Hot Standby Router Protocol", http://www.enterprisenetworkingplanet.com/nethub/article.php/1438251, 2002.*
Knight, et al. "Virtual Router Redundancy Protocol", <draft-ietf-vrrp-spec-v2-05.txt>, Jan. 2000.*

* cited by examiner

*Primary Examiner*—David R Vincent
*Assistant Examiner*—Li-Wu Chang
(74) *Attorney, Agent, or Firm*—Van Pelt, Yi & James, LLP (57) ABSTRACT

An enhanced virtual router redundancy protocol for manipulating master router selection within a network is disclosed. The use of a priority control policy and priority values take into account conditions and events that may distinguish the desirability of one router over another. Explicit priority values may be specified to indicate the explicit priority of a particular router instance. Delta priority values may also be used to decrement or increment a base priority for a particular router instance. By using priority control policies and priority values to select a master, improved control, management, and manipulation of virtual router instances over a particular IP core network interface are enabled.

19 Claims, 6 Drawing Sheets

ENHANCEMENT OF VRRP INTERFACE AND ROUTER SELECTION WHERE AN NON-OWNER ROUTER IS CONFIGURED TO RESPOND TO CONTROL AND MANAGEMENT MESSAGES ADDRESSED TO AN ADDRESS ASSOCIATED WITH THE VIRTUAL REDUNDANT ROUTER

CROSS REFERENCE TO RELATED APPLICATIONS

This application claims priority to U.S. Provisional Patent Application No. 60/466,323 entitled "Enhanced virtual router redundancy protocol" filed Apr. 28, 2003 which is incorporated herein by reference for all purposes.

FIELD OF THE INVENTION

The present invention relates generally to computer networks. More specifically, an enhanced virtual router redundancy protocol is disclosed.

BACKGROUND OF THE INVENTION

The Virtual Router Redundancy Protocol (VRRP) provides for the implementation of a redundant IP interface to be shared between two or more routers on a common LAN segment. VRRP is described in IETF RFC 2338. VRRP allows you to provide alternate router paths for a host without changing the IP address or MAC address by which the host knows its gateway. The use of virtual routers, or abstract objects that may include one or more physical routers, enables failover redundant routing in the event a master router fails due to non-availability or another type of event. However, the existing protocol suffers from various limitations.

In VRRP control and management abilities (e.g., the ability to respond to ICMP ping, TCP connection requests, etc.) are limited to owner routers. Routers are classified as owners and non-owners, where owners "own" an actual IP address for the interface or gateway to a LAN, WAN, MAN, LAN segment, etc. This means that only owners may respond to management-oriented protocols such as ICMP ping. If the owner router fails, is taken out of service, or otherwise becomes unavailable, then no router, including a non-owner router that takes over as the master router for the virtual router identifier (VRID) with which the IP address used for the virtual router is associated, will respond to management-oriented messages, such as those used for testing connectivity (e.g., ICMP Ping). If a backup non-owner router is assigned as the new master router, it will not respond to messages sent to the IP address associated with the virtual router identifier for which it has taken over as master because that IP address is an actual interface only on the owner. Thus, system and network administrators are unable to gather information as to whether a particular gateway has connectivity. More problematic is the master selection process specified in VRRP.

VRRP does not specify events or conditions that determine how a master is selected from non-owner routers. When a master router fails, VRRP provides for the next specified non-owner router to become master. However, this fails to take into account events or network conditions that could affect whether a particular non-owner router is better suited to become master over another. This may lead to the inefficient selection of backup non-owner routers as master routers.

Thus, a solution is needed for an improved virtual router redundancy protocol for selecting a master router. Additionally, a solution is required that enables master router selection based on criteria such as availability and priority.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

An enhanced virtual router redundancy protocol is disclosed. In some embodiments, the enhancements provide a degree of control over the backup router priority values used to determine which backup router will take over as master in the event the owner/master fails or otherwise becomes unavailable. Router, as used herein, may refer to a virtual router comprising a master router and one or more backup routers associated with the same virtual router identifier (VRID). Selecting a master router based on backup router priorities determined at least in part by applying a priority control policy to one or more of the backup routers is disclosed. The priority control policy and priority values may be used to adjust a backup router's priority based on network conditions and events (hereinafter referred to as "event" or "events") that may affect the router's availability, efficiency, or effectiveness in the role as master. In some embodiments, explicit priority values may be specified to indicate the explicit priority level to which a backup router should be set if a corresponding event should occur. In some embodiments, delta priority values may be used to decrement or increment a base priority for a particular backup router. In some embodiments, explicit priority values may override delta priority values. If no explicit priority values are provided, then delta priority values may be used to derive an overall priority for a backup router. By using priority control policies and priority values to select a master from among backup/non-owner routers associated with the same VRID, improved control and manipulation of virtual router instances are enabled.

Figure 1:
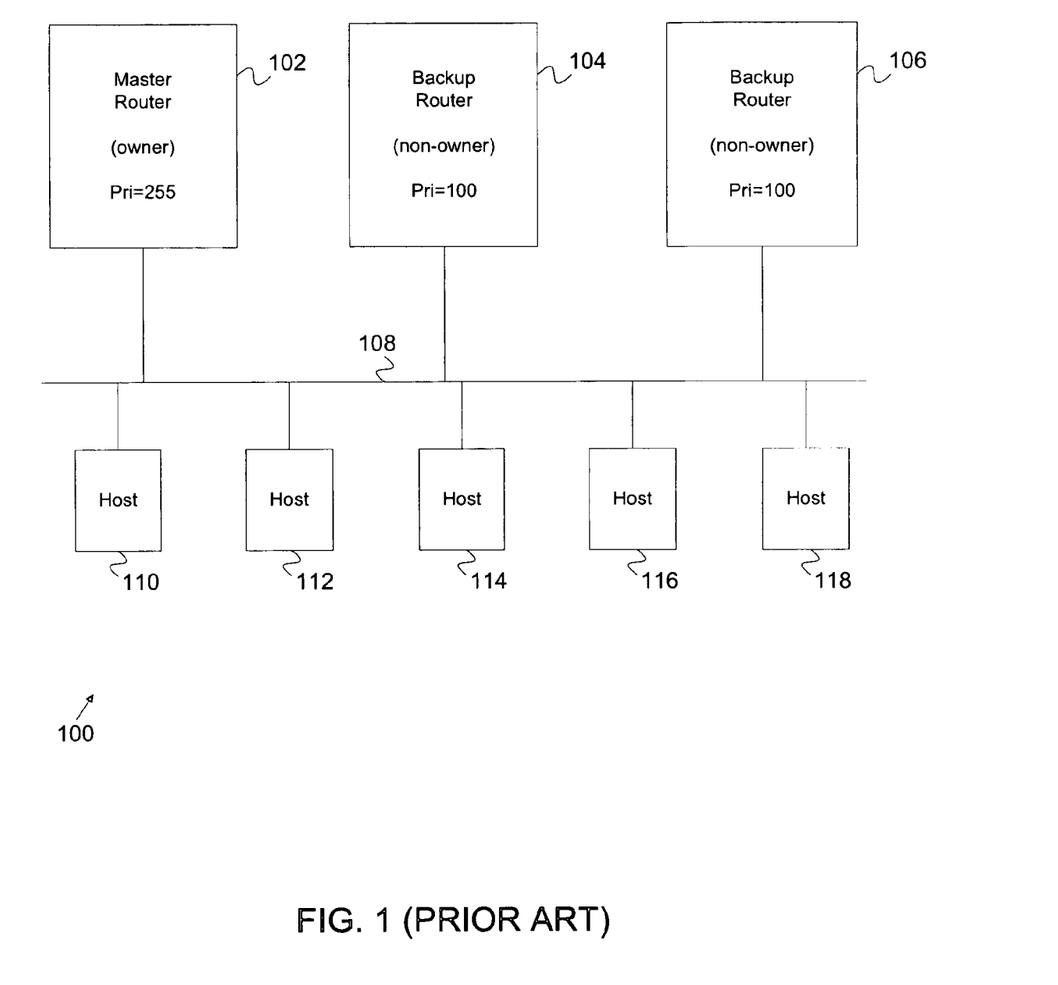
FIG. 1 illustrates an exemplary system for implementing an enhanced virtual router redundancy protocol.

FIG. 1 illustrates an exemplary system 100 for implementing an enhanced virtual router redundancy protocol. A network 100 is shown having several routers and hosts attached. Master router 102, backup router 104-106 may be associated with a virtual router instance that acts as a gateway or interface for routing data (e.g., packets, segments, frames, etc.). In this example, master router 102 and backup routers 104-106 are connected to network 108, which has hosts 110-118. Network 108 may be a LAN, LAN segment, or other type of network besides those mentioned herein. Data sent to hosts 110-118 are routed through master router 102 over network 108. Similarly, data sent by hosts 110-118 to destinations beyond network 108 (e.g., the Internet, or an intranet) may be sent via master router 102 acting, e.g., as a default gateway to such destinations beyond network 108.

To provide redundancy, without requiring that the hosts 110-118 be reconfigured with different default gateway information in the event the master router 102 becomes unavailable, the virtual router redundancy protocol (VRRP) provides a way to define a virtual router comprising, e.g., master router 102 and backup routers 104-106. The routers 102-106 may each be associated with the same VRID, which VRID is in turn associated with, e.g., an actual IP interface owned by router 102. The hosts 110-118 may then be configured to use the virtual router represented by the VRID as their default gateway. If the master/owner router 102 becomes unavailable, one of the backup routers 104 or 106 becomes master and begins to handle traffic sent to the IP address/MAC address associated with the VRID, even though the non-owner/master (i.e., the former backup that has become master) does not actually own the IP address associated with the VRID.

Each router may also be classified as an owner or non-owner. An owner router "owns" as an actual IP interface of the owner router the IP address associated with the VRID of the virtual router. As such, the owner router always responds to control and management messages, such as ICMP echo requests, ping requests, etc., so long as it is online and able to receive and respond to such messages. A non-owner normally would not respond to such control and management messages sent to the IP address associated with the VRID, even when not as a master router, because the IP address associated with the VRID is not an actual IP interface of the non-owner router(s). However, in some embodiments, system 100 may be configured to enable non-owner routers to respond to control and management messages sent to the IP address associated with the VRID of the virtual router at a time when the non-owner is serving as master. In other words, this restraint in VRRP may be overridden using the enhanced protocol described herein. This enables administrators to use well-known techniques, e.g., ICMP Ping, to test connectivity to their default gateway using the IP address and MAC address associated with the virtual router, and receive a reply even if a non-owner router is acting as master for the VRID. In the example shown in FIG. 1, each router has a priority value associated with it. For example, master router 102 has a priority value of 255, which is the priority level prescribed by the VRRP for an owner router and the highest possible priority value under the protocol. This ensures that if the owner is available, it becomes the master. Backup routers 104 and 106 each have an initial priority value of 100, the initial priority value prescribed by VRRP for non-owner routers.

Figure 2:
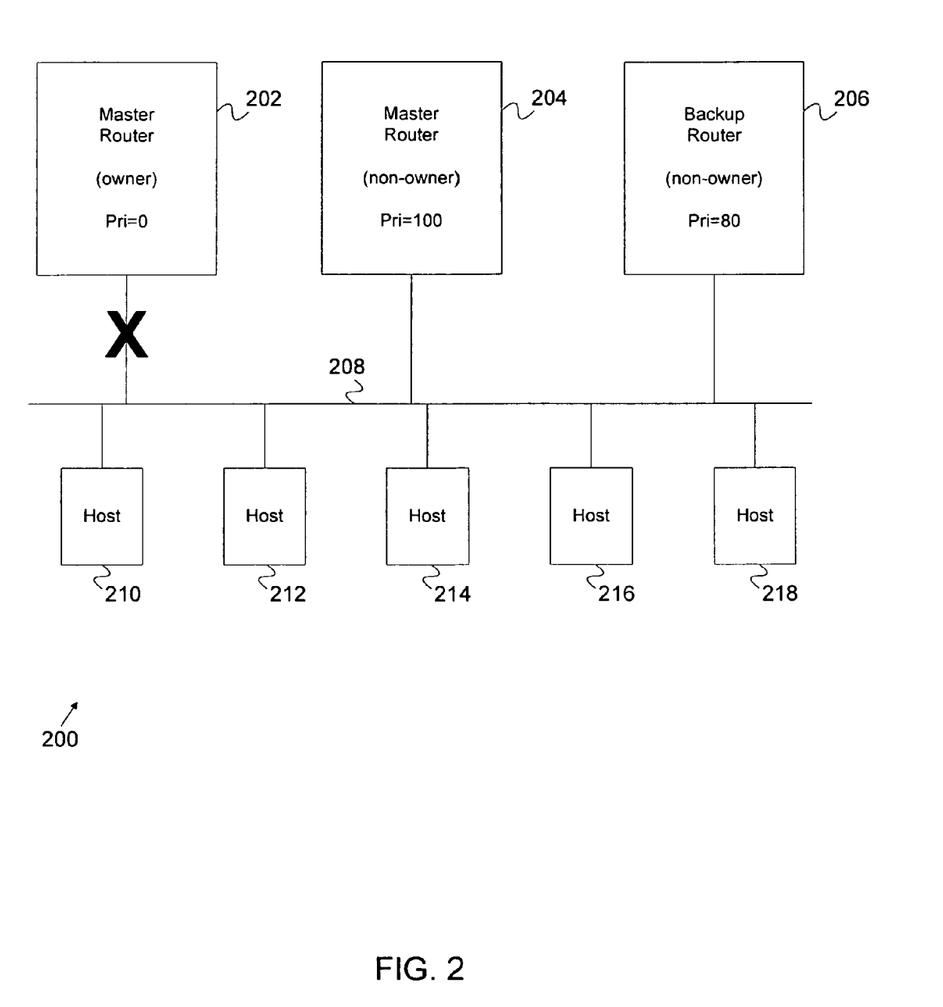
FIG. 2 illustrates an exemplary system for implementing an enhanced virtual router redundancy protocol when a master router fails.

FIG. 2 illustrates an exemplary system 200 for implementing an enhanced virtual router redundancy protocol. In the example shown, the original master router, owner router 202, has failed or otherwise become unavailable, as indicated by the large "X" below owner router 202. Under VRRP, one way that owner router 202 may be removed from the role of master absent a failure, e.g., to perform maintenance on or reconfigure the owner router, is to manual set its priority to 0, as shown in FIG. 202. Non-owner routers 204 and 206 remain connected to network 208. In the example shown, non-owner routers have determined, based on their respective priorities at the time the original master 202 became unavailable (shown in this example as being 100 for non-owner router 204 and 80 for non-owner router 206), that non-owner router 204 will act as master and non-owner router 206 will continue to serve as a backup, because non-owner router 204 had the higher priority. When hosts 210-218 send data via network 208 to their default gateway, using the same IP and MAC address as they used when owner router 202 was serving as master, new master router 204 will process and forward the packets, thereby providing continuing connectivity to networks (e.g., the Internet) beyond network 208 without requiring any change to the configuration of hosts 210-218.

Figure 3:
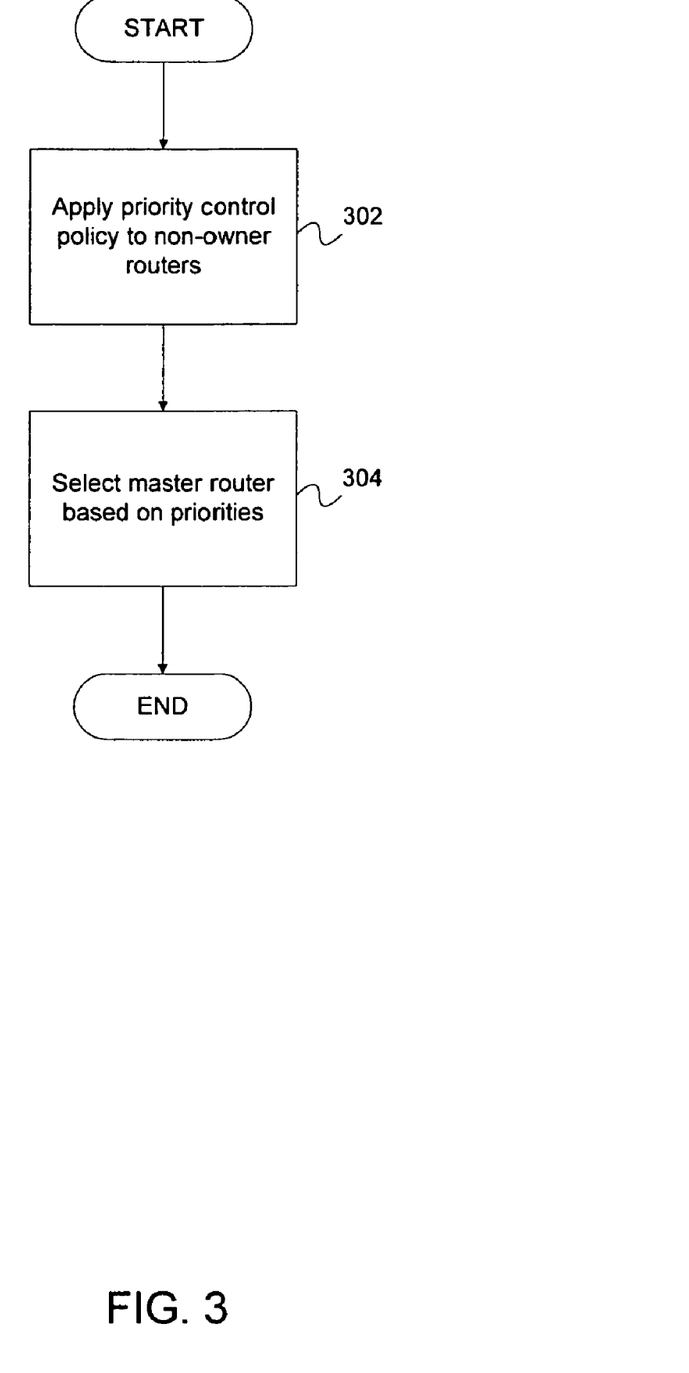
FIG. 3 illustrates an exemplary process for applying a priority control priority to select a master router.

FIG. 3 illustrates an exemplary process for applying a priority control policy to adjust a priority value on a non-owner router. As an example, a priority control policy may be used to adjust on each of a plurality of non-owner routers associated with a VRID the "in use" priority of the non-owner router. Under VRRP, the adjusted in use priorities of the respective non-owner routers is used to arbitrate between them to determine which router becomes master in the event a current master router fails, becomes unavailable, loses connectivity, etc. A priority control policy is applied to non-owner routers (302). The priority control policy specifies how to determine priority values for non-owner routers. In some embodiments, as described more fully below, step 302 comprises adjusting an in use priority level from an initial base priority of 100 in response to the occurrence of an event defined in a priority control policy associated with the non-owner router. In some embodiments, events may either be associated with an explicit priority value (e.g., 80) or an amount by which the in use priority should be decremented or, in some embodiments, incremented. In the event the current master router becomes unavailable, a new master router is selected based on the respective priorities of the available non-owner routers as adjusted based on their respective priority control policies (304). In some embodiments, one or more non-owner routers may have a priority control policy that is different from the priority control policy applied to one or more other non-owner routers associated with the same VRID.

In some embodiments, the priority of a router may be determined under a priority control policy either by setting the priority level to an explicit level associated with an event defined in the policy (sometimes referred to below as an "explicit" type priority event), or by decrementing (or, in some embodiments, incrementing) the in use priority by an amount associated with such an event (sometimes referred to below as a "delta" type priority event). Each event generates a VRRP priority event message. Priority event messages include information that may be used to determine the priority of a non-owner router. This information includes a policy identifier (policy-id) that identifies the priority control policy with which the event is associated, an event type (examples provided below), a priority type (explicit or delta), both of which are described more fully in FIGS. 4 and 5), and an event priority value. In this embodiment, the event priority value is expressed numerically. In other embodiments, the event priority value may be expressed in alternative forms (e.g., on or off, 1 or 0, an arbitrarily defined code or value, etc.). Additionally, less or more information than that described above may be included.

As discussed above, priority events include information that identifies a priority type and value, either an explicit priority value or a delta priority value. Events that may affect priority may be referred to as priority events. Examples of priority events include port down, LAG degrade, host unreachable, route unknown, OSPF down, IS-IS down, LDP down, TLDP down, BGP down, LSP down, or other indications that may affect the ability to route packets to one or more destinations. These and/or other or different events may be defined in the priority control policy. Events may be generated based on conditions or occurrences local to the router or based on remote conditions or information (e.g., reachability). Explicit priority values are those that define a set priority value for a router. The process of using explicit priority values to set the priority of a router is described in connection with FIG. 4. In contrast, delta priority values are values used to decrement or increment a base priority value.

A base priority value provides for a priority value that is either replaced by an explicit priority value or modified by a delta priority value. Delta priority values may either increment or decrement the base priority value to yield an adjusted in use priority value. As a result, the in use priority of each non-owner router on which a priority control policy has been implemented may change over time and explicit type and delta type events occur. In the embodiment illustrated in FIG. 4 and described more fully below, e.g., explicit priority values override delta priority values. However, in other embodiments, delta priority values may override explicit priority values or the two may be handled equally. The process for using delta priority values to adjust the in use priority of a non-owner router is described in greater detail below in connection with FIG. 5. In either case, the base priority value may have upper and lower limits that can be specified in the protocol, by a user, or set automatically to a default value. In one embodiment, the in use priority may not be decrement to be less than 1, to prevent a non-owner router from being rendered operationally unavailable.

Figure 4:
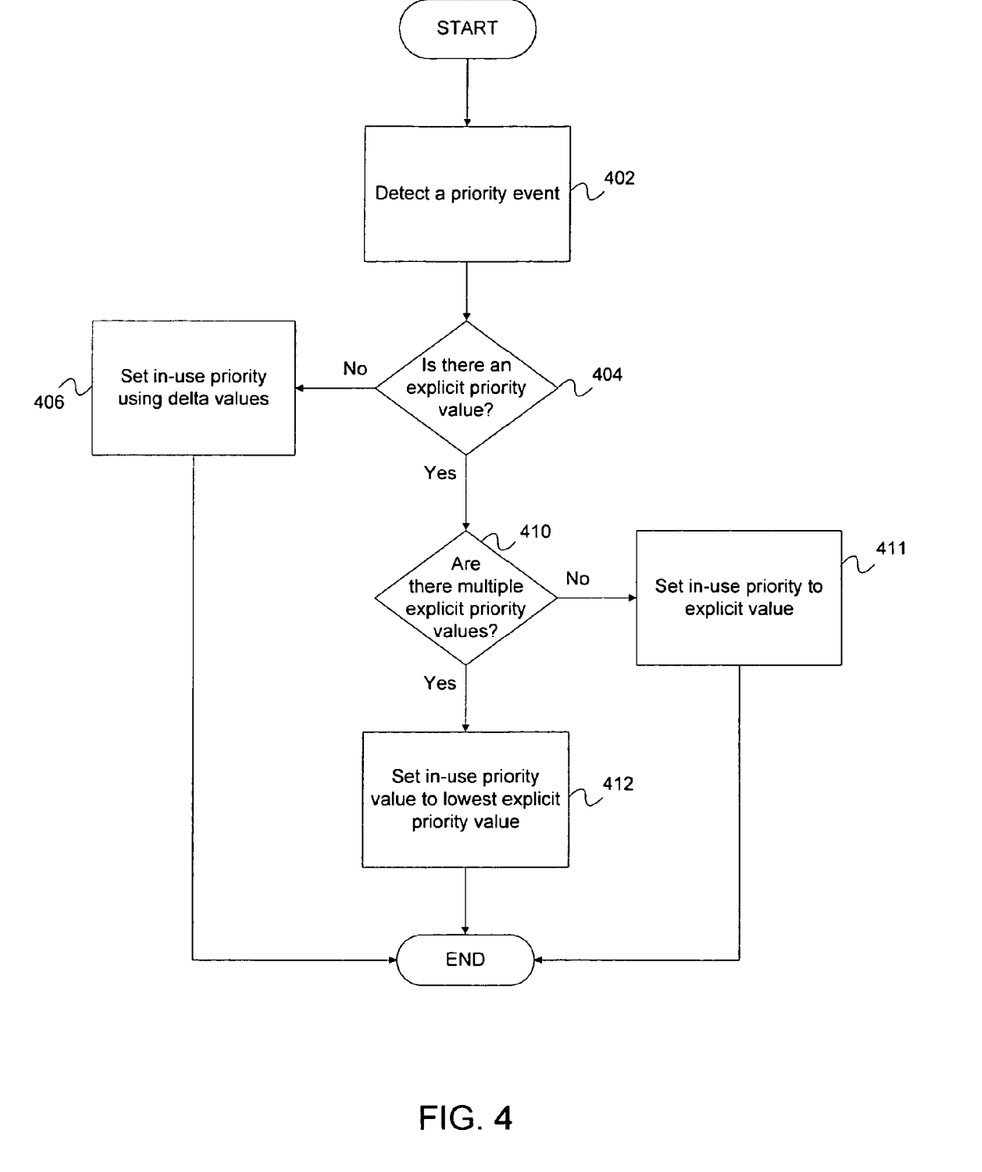
FIG. 4 illustrates an exemplary priority control process using explicit priority values.

FIG. 4 illustrates an exemplary priority control process. In this example, explicit priority values are set values associated with a specified event or condition. In some embodiments, explicit values may override a delta priority value. In the process shown in FIG. 4, a priority event is detected (402). A determination is made as to whether an explicit priority value is associated with the event detected in FIG. 402 and/or any previously detected event or condition (404). If there are no explicit priority values, then delta priority values are used to determine the in use priority (406). When delta priority values are used, as in step 406, the in-use priority value is set by decrementing or incrementing a base value, as described more fully below in connection with FIG. 5.

If it is determined in step 404 that an explicit priority value is present, e.g., because the event detected in step 402 and/or a previously-detected event or condition that is still present or relevant has an explicit priority value associated with it, then a check is performed to determine whether multiple explicit priority values exist(410), i.e., whether there are multiple events or conditions that have explicit values associated with them. For example, a previously generated Port Down priority event may have associated with it a first explicit priority of 80 and a subsequently received OSPF Down priority event, received while the port that generated the Port Down priority event is still down, may have associated with it a second explicit priority of 60. In such a case, it would be determined in step 410 that multiple explicit priority values are present. If multiple explicit priority values are present, then the lowest explicit priority value is set as the priority value for the evaluated router (412), after which the process ends. If multiple explicit priority values are not detected (410), i.e., there is only one currently applicable event or condition that has an explicit priority value associated with it, then the in use priority for the router is set to the explicit value (411), after which the process ends.

Figure 5:
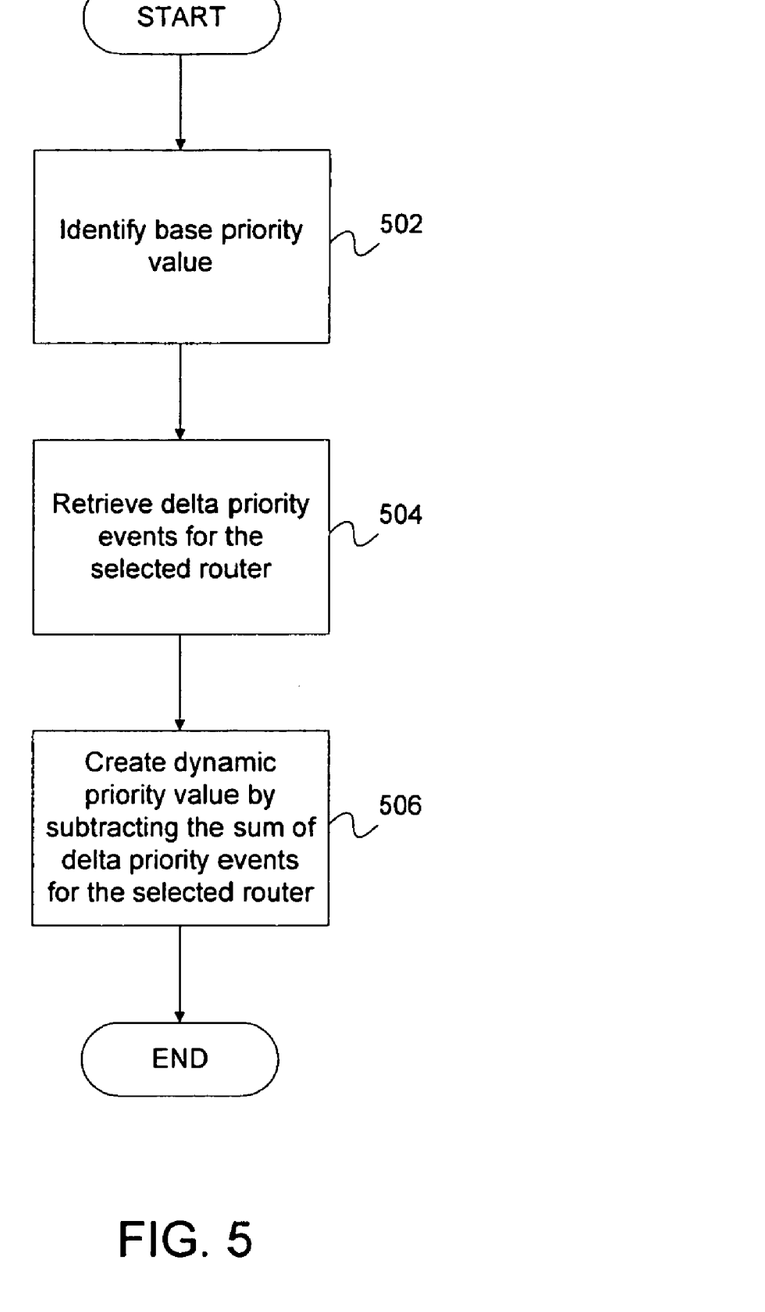
FIG. 5 illustrates an exemplary priority control process using delta priority values.

FIG. 5 illustrates a process for setting an in use priority value using delta priority values. The process of FIG. 5 is used in some embodiments to implement step 406 of FIG. 4. Here, a base priority for the router is determined (502). Delta priority values are retrieved for the router (504). These may comprise a delta value for the most recently detected event and/or one or more delta values associated with previously-detected but still present and/or otherwise relevant events or conditions. An in use priority value is then created for the affected router (506). In some embodiments, multiple priority events may be applicable to a router. This may require applying multiple delta priority values to a base priority value.

In some embodiments, if multiple delta type events or conditions are present, the respective delta values are combined and then applied to the base priority to calculate an adjusted in use priority. In other embodiments, delta or explicit priorities are applied as the events that generated them occur, and a subsequently received delta is applied to the previously-adjusted in use priority, such that the cumulative effect of the events is reflected in the in use priority.

Figure 6:
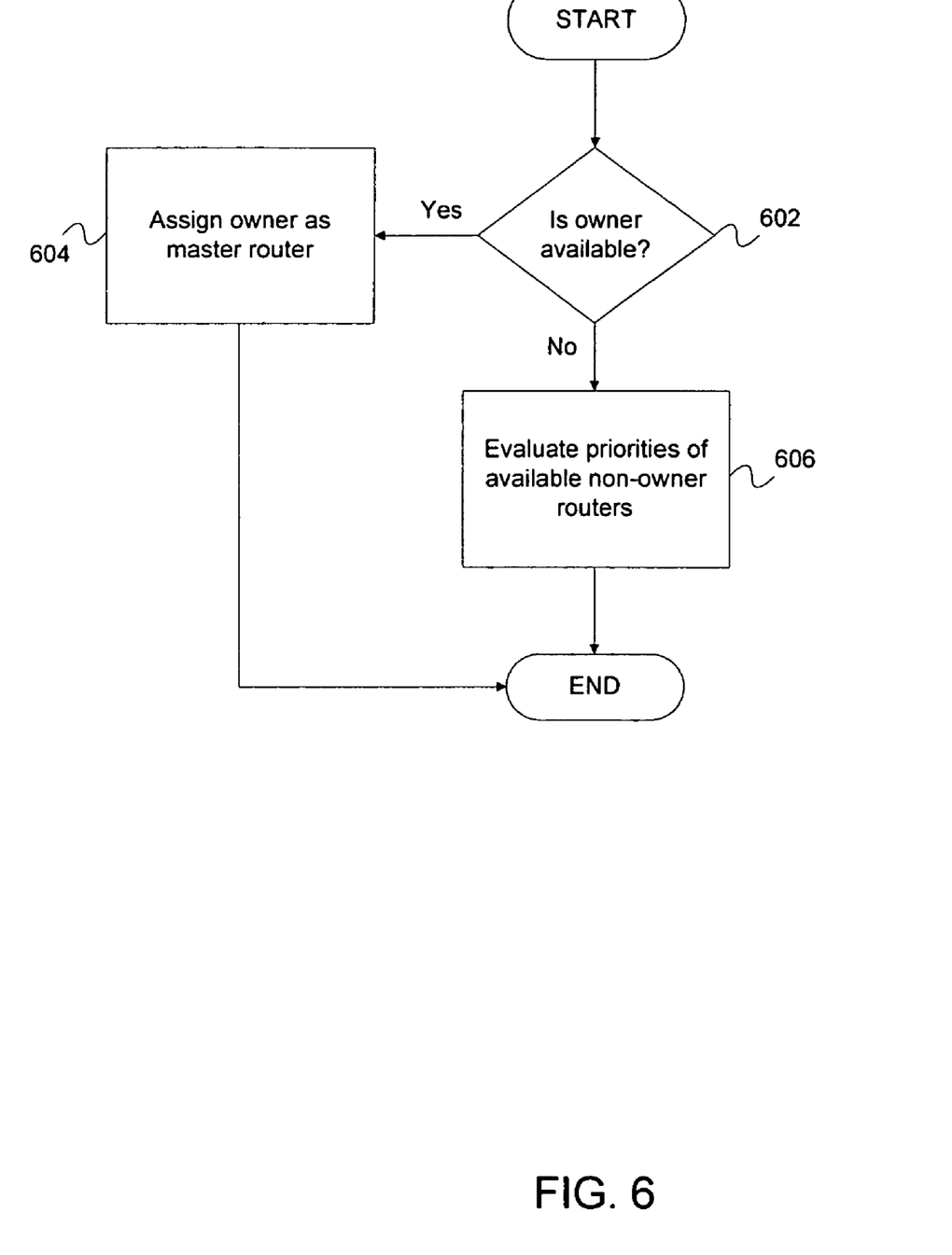
FIG. 6 illustrates an exemplary master router selection process.

FIG. 6 illustrates an exemplary master router selection process. In this example, a determination is made as to whether the IP address owner (for the given interface) is available (602). If the owner router is available, then it is assigned as the master router (604). In some embodiments, this results from the fact that the owner is configured to have a priority of 255, the highest possible value and higher than the range permitted for non-owner routers (typically from 1 or some other very low value to 254). However, if the owner router is unavailable, then a master router is selected from among the non-owner backup routers by evaluating the priority values, as described above in connection with FIGS. 3-5 (606). The selection of non-owner routers using the techniques described above provides for a granular ability to manipulate the criteria, conditions, and events that define a non-owner router's candidacy for master router. Such manipulation enables greater control and management of data routing using protocols such as VRRP.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for providing a virtual redundant router, comprising:

enabling a user to define with respect to an actual non-owner router associated with the virtual redundant router one or more events and for each event a corresponding effect of the event on a priority associated with the actual non-owner router; and in the event one or more of said one or more events occurs, adjusting the priority based at least in part on the corresponding effect associated with the event;

wherein an owner router and the non-owner router each owns a separate Internet Protocol (IP) or a separate Media Access Control (MAC) address, and the virtual redundant router is associated with a virtual router identifier (VRID) and associated with an Internet Protocol (IP) or MAC address associated with the owner router but not the non-owner router;

wherein the non-owner router is configured to respond to control and management messages including ICMP pings addressed to an Internet Protocol (IP) or MAC address that is associated with and owned by the owner router, in the event the non-owner router becomes a master associated with the virtual redundant router based at least in part on the priority; and wherein the owner router owns as an actual network interface of the owner router the IP or MAC address associated with the VRID of the virtual redundant and the non-owner router, absent being configured to do so after becoming the master, will not respond to control and management messages sent to the IP or MAC address associated with the VRID, even upon taking over as the master router for the virtual redundant router, because the IP or MAC address associated with the VRID is not an actual IP or MAC address of the non-owner router;

wherein adjusting the priority includes processing an explicit priority value associated with an event and a delta priority value associated with another event.

2. A method as recited in claim 1 wherein one or more non-owner routers have a priority control policy that is different from the priority control policy applied to one or more other non-owner routers associated with the same VRID.

3. A method as recited in claim 1 further comprising selecting a master router for the virtual redundant router based at least in part on the priority.

4. A method as recited in claim 1 wherein the priority comprises an in use priority for the router under the virtual redundant router protocol (VRRP).

5. A method as recited in claim 1 wherein the priority comprises an in use priority for the actual router under the virtual redundant router protocol (VRRP); the actual router comprises a non-owner router; the method further comprises selecting a master router for the virtual redundant router based at least in part on the priority; and in the event the actual router is selected to act as the master router, configuring the actual router to respond to control and management messages sent to an IP address associated with the virtual redundant router.

6. A method as recited in claim 1 further comprising receiving and evaluating a priority event message that identifies an event that has occurred and the corresponding effect of the event on the priority.

7. A method as recited in claim 1 further comprising receiving and evaluating a priority event message generated as a result of the occurrence of one of said one or more events, wherein the priority event message identifies the event that has occurred and the corresponding effect of the event that has occurred on the priority.

8. A method as recited in claim 1 wherein adjusting the priority includes processing an explicit priority value associated with an event that has occurred.

9. A method as recited in claim 1 wherein adjusting the priority includes adding or subtracting from a base priority value a delta priority value associated with an event that has occurred.

10. A method as recited in claim 1 further including generating upon the occurrence of a specified event an event priority message including the corresponding effect of the specified event on the priority.

11. A method as recited in claim 1 wherein each event of a first type of event has associated with it a corresponding explicit value for the priority and each event of a second type of event has associated with it a corresponding delta value by which the priority is to be decremented or incremented.

12. A method as recited in claim 1 wherein each event of a first type of event has associated with it a corresponding explicit value for the priority and each event of a second type of event has associated with it a corresponding delta value by which the priority is to be decremented or incremented and the step of adjusting the priority further includes:

determining upon receiving an indication that an event has occurred whether any currently applicable event is of the first type; and in the event it is determined that one or more currently applicable events are of the first type, adjusting the priority to the lowest of the corresponding explicit priority values.

13. A method as recited in claim 12 further comprising applying in part a combination of the corresponding effects of any currently applicable events of the second type in the event it is determined that no currently applicable event is an event of the first type.

14. A method as recited in claim 13 wherein applying the combined effect of any currently applicable events of the second type comprises taking the sum of the delta value(s) associated with the event(s) of the second type and adding or subtracting the result, as appropriate, to a base value for the priority.

15. A system for providing a virtual redundant router, comprising:

a network interface configured to receive network traffic associated with the virtual redundant router for a processor; and the processor configured to:

enable a user to define one or more events and for each event a corresponding effect of the event on a priority; and in the event one or more of said one or more events occurs, adjust the priority based at least in part on the corresponding effect associated with the event;

wherein an owner router and the non-owner router each owns a separate Internet Protocol (IP) or a separate Media Access Control (MAC) address, and the virtual redundant router is associated with a virtual router identifier (VRID) and associated with an Internet Protocol (IP) or MAC address associated with the owner router but not the non-owner router;

wherein the system comprises a non-owner router configured to respond to control and management messages including ICMP pings addressed to an Internet Protocol (IP) or MAC address that is associated with and owned by the owner router, in the event the non-owner router becomes a master associated with the virtual redundant router based at least in part on the priority;

wherein the owner router owns as an actual network interface of the owner router the IP or MAC address associated with the VRID of the virtual redundant and the non-owner router, absent being configured to do so after becoming the master, will not respond to control and management messages sent to the IP or MAC address associated with the VRID, even upon taking over as the master router for the virtual redundant router, because the IP or MAC address associated with the VRID is not an actual IP or MAC address of the non-owner router;

wherein adjusting the priority includes processing an explicit priority value associated with an event and a delta priority value associated with another event.

16. A computer program product for providing an interface, the computer program being embodied in a computer readable storage medium and comprising computer instructions for:

enabling a user to define with respect to an actual non-owner router associated with the virtual redundant router one or more events and for each event a corresponding effect of the event on a priority associated with the actual non-owner router; and in the event one or more of said one or more events occurs, adjusting the priority based at least in part on the corresponding effect associated with the event;

wherein an owner router and the non-owner router each owns a separate Internet Protocol (IP) or a separate Media Access Control (MAC) address, and the virtual redundant router is associated with a virtual router identifier (VRID) and associated with an Internet Protocol (IP) or MAC address associated with the owner router but not the non-owner router;

wherein the non-owner router is configured to respond to control and management messages including ICMP pings addressed to an Internet Protocol (IP) or MAC address that is associated with and downed by the owner router, in the event that non-owner router becomes a master associated with the virtual redundant router based at least in part on the priority;

wherein the owner router owns as an actual network interface of the owner router the IP or MAC address associated with the VRID of the virtual redundant and the non-owner router, absent being configured to do so after becoming the master, will not respond to control and management messages sent to the IP or MAC address associated with the VRID, even upon taking over as the master router for the virtual redundant router, because the IP or MAC address associated with the VRID is not an actual IP or MAC address of the non-owner router;

wherein adjusting the priority includes processing an explicit priority value associated with an event and a delta priority value associated with another event.

17. The method of claim 1, wherein the non-owner router takes over as the master router only in the event a current master router fails, loses connectivity or otherwise becomes unavailable.

18. The system of claim 15, wherein the non-owner router takes over as the master router only in the event a current master router fails, loses connectivity or otherwise becomes unavailable.

19. The computer program of claim 16, wherein the non-owner router takes over as the master router only in the event a current master router fails, loses connectivity or otherwise becomes unavailable.

* * * * *